United States Patent [19]

Weiss

[11] Patent Number: 5,419,636

[45] Date of Patent: * May 30, 1995

[54] MICROBEND FIBER-OPTIC TEMPERATURE SENSOR

[75] Inventor: Jonathan D. Weiss, Albuquerque, N. Mex.

[73] Assignee: Sandia Corporation

[ * ] Notice: The portion of the term of this patent subsequent to Jul. 21, 2009 has been disclaimed.

[21] Appl. No.: 105,991

[22] Filed: Aug. 12, 1993

[51] Int. Cl.⁶ .................... G01K 11/00; G01K 5/62
[52] U.S. Cl. .................................. 374/161; 385/12; 250/227.14
[58] Field of Search ............... 374/131, 130, 159, 161; 250/227.16, 227.14; 385/12

[56] References Cited

U.S. PATENT DOCUMENTS

| 4,039,248 | 8/1977 | Franke et al. | 350/96 B |
|---|---|---|---|
| 4,443,700 | 4/1984 | Macedo et al. | 250/227.16 |
| 4,678,903 | 7/1987 | Wlodarczyk et al. | 250/227 |
| 4,729,627 | 3/1988 | Saito et al. | 374/159 X |
| 4,812,645 | 3/1989 | Griffiths | 250/231 P X |
| 4,846,547 | 6/1989 | Falco et al. | 350/96.29 |
| 5,096,277 | 3/1992 | Kleinerman | 374/162 |
| 5,132,529 | 7/1992 | Weiss | 250/227.16 |
| 5,251,274 | 10/1993 | Carlstrom et al. | 250/227.16 |
| 5,258,614 | 11/1993 | Kidwell et al. | 250/227.16 |
| 5,272,333 | 12/1993 | Fagan et al. | 250/227.16 |

OTHER PUBLICATIONS

N. Lagakos et al., "Microbend Fiber-Optic Sensor," Applied Optics, vol. 26, No. 11 pp. 2179 (Jun. 1987).
J. N. Fields et al, "Fiber Optic Pressure Sensor" J. Acoust. Soc. Am. vol. 67, No. 3, pp. 816-818 (Mar. 1980).
J. N. Fields, "Attenuation of a Parabolic-Index Fiber with Periodic Bends," Applied Physics Letters, vol. 36, No. 10, pp. 799-801 (May 1980).

Primary Examiner—Diego F. F. Gutierrez
Attorney, Agent, or Firm—Gregory A. Cone

[57] ABSTRACT

A temperature sensor is made of optical fiber into which quasi-sinusoidal microbends have been permanently introduced. In particular, the present invention includes a graded-index optical fiber directing steady light through a section of the optical fiber containing a plurality of permanent microbends. The microbend section of the optical fiber is contained in a thermally expansive sheath, attached to a thermally expansive structure, or attached to a bimetallic element undergoing temperature changes and being monitored. The microbend section is secured to the thermally expansive sheath which allows the amplitude of the microbends to decrease with temperature. The resultant increase in the optical fiber's transmission thus allows temperature to be measured. The plural microbend section of the optical fiber is secured to the thermally expansive structure only at its ends and the microbends themselves are completely unconstrained laterally by any bonding agent to obtain maximum longitudinal temperature sensitivity. Although the permanent microbends reduce the transmission capabilities of fiber optics, the present invention utilizes this phenomenon as a transduction mechanism which is optimized to measure temperature.

22 Claims, 5 Drawing Sheets

MICROBEND FIBER-OPTIC TEMPERATURE SENSOR

The present invention was conceived and developed in the performance of a United States Government contract. The United States Government has rights in this invention pursuant to Contract No. DE-AC04-76DP00789 between the Department of Energy and the American Telephone and Telegraph Company.

BACKGROUND OF THE INVENTION

1. Field of the Invention

This invention relates generally to a fiber-optic sensor for measuring temperature. More specifically, this invention relates to a fiber-optic temperature sensor constructed of optical fiber into which permanent microbends have been introduced.

2. Description of the Prior Art

In certain situations, fiber optic temperature sensors may be more suitable than their electronic equivalents because of their immunity to electromagnetic interference and their inability to create potentially hazardous sparks. Because of these qualities, fiberoptic sensor research has significantly expanded during the past decade. Fiber optics has matured in the application of fiber optics as sources, detectors, and other optical components.

It is well-established that small random or periodic undulations in the direction of an optical fiber's axis, known as microbends, can cause a significant reduction in the fiber's optical transmission. Since this phenomenon hinders optical transmission, most of the prior art is concerned with minimizing this effect.

Wlodarczyk et. al., U.S. Pat. No. 4,678,903, teaches a method for the self-alignment of a microbend sensor contained within a tubular housing which is configured with internal threads and an inner expandable insert with external threads to induce microbends in an optical fiber. Expansion of an inner tube against an outer tube, under internal pressure, produces the non-existent microbends.

Falco et. al., U.S. Pat. No. 4,846,547, relates to a fiber-optic detector capable of producing microbends in an optical fiber in response to the variation of a physical quantity or of an environmental parameter such as temperature. Falco describes a confining structure comprising a two-component sheath whose components contain deformations and expand at different rates resulting in periodic deformations which are expected to be impressed on an optical fiber. To produce such a sheath requires the manufacture of non-existent periodic deformations in an optical fiber using photo-etching techniques and a two-component sheath.

Franke et. al., U.S. Pat. No. 4,039,248, describes a method of cabling an optical fiber so as to minimize the influence of temperature and other external perturbations on the fiber's transmission. Franke et. al. does not describe the use of an optical fiber as a temperature sensor. Franke configures the optical fiber within a sheath in a sinusoidal fashion through the use of studs or clamps to secure its position and avoid microbends in the optical fiber. Van der Hock, U.S. Pat. No. 4,468,088, casts doubt upon the desired function described in Franke (U.S. Pat. No. 4,039,248) as Van der Hock notes the possibility of the fiber developing micro cracks and finally breaking.

U.S. Pat. No. 5,132,529 (Weiss, the present inventor) measures changes in a fiber's optical transmission when attached to a substrate undergoing strain. An optical fiber containing quasi-sinusoidal microbends provides a mechanism for establishing a relationship between a diminished amplitude of the microbends and an increased optical transmission of the fiber. The mechanical wavelength (period) and amplitude of the microbends of a plastic optical fiber are optimized to measure strain. The mechanism used to stretch the optical fiber is mechanically expansive and designed for thermal insensitivity which exhibits relative displacement with respect to said first end of the microbend section as a function of temperature.

An article by N. Lagakos, et. al., "Microbend Fiber-optic Sensor," Applied Optics, Vol. 26, No. 1 1, pp. 2179, 1 June 1987, discusses a microbend fiber-optic sensor which is capable of sensing temperature. However, similar to the patents discussed above, the sensor utilizes a structure to impress non-existent microbends in the optical fiber. Additionally, the sensor does not employ an undulating tube as a confining structure to sense temperature.

A microbend fiber-optic pressure sensor is discussed by Fields et. al., *J. Acoust. Soc. Am.*, Vol. 67, No. 3, Mar. 1980; the device does not measure temperature. The Fields structure uses one fiber-optic path and measures light intensity instead of optical phase shits, but requires a large, bulky, and complicated ridged pressure plate apparatus. Fields' device includes two mating ridged plates placed around a multi-mode step-index silica fiber, one end of which is illuminated by a laser and the other end monitored with a calibrated photometer. Motion is perpendicular to the axis of the fiber. A load applied to the pressure plates causes a quasi-sinusoidal distortion of the fiber. The device provides mechanically-induced amplification of light attenuation in the fiber caused by bending forces acting on the fiber; however, the size and bulkiness of the structure is simply not appropriate for a temperature sensor.

An article by J. N. Fields, "Attenuation of a Parabolic-Index Fiber with Periodic Bends," *Applied Physics Letters* (10), pp. 799–801, 15 May 1990, discusses measurements of excess loss induced by periodic distortions of multimode optical fibers having parabolic- or step-index profiles.

Cost and complexity have precluded the commercialization of many ingenious fiber-optic sensors. Thus, there is an existing need for a simple fiber-optic temperature sensor, which possesses the mechanical amplification of the Fields' structure without bulky, complicated, and ridged apparatus, and which measures the intensity of the light received rather than the interferometric phase shift.

The present invention differs from the above prior art in that it is explicitly a temperature sensor, and the optical fiber is deliberately configured in a manner to be strongly affected by temperature whereas the prior art teaches away from the effects of temperature. The prior art is concerned with eliminating the effect of temperature, such as degradation on an optical fiber so as to avoid fracturing it. Additionally, optimization of the mechanical wavelength and amplitude of the microbends is different for a step- or graded-index optical fiber to measure temperature. These parameters must be specifically selected for optimum transmission of the optical fiber over a wide range of temperature.

SUMMARY OF THE INVENTION

The present invention relates to a fiber-optic temperature sensor including at least one optical path of optical fiber directing steady light through a section of the optical fiber containing a plurality of permanently introduced microbends. The plural microbend section of the optical fiber is inserted into and attached to a sheath or attached to another thermally expansive confining structure and secured, typically at either end of the microbend section, to the thermally expansive confining structure undergoing temperature changes and being monitored. The plural microbend section of the optical fiber is secured to the thermally expansive confining structure only at its ends and the microbends themselves are completely unconstrained by any bonding agent to obtain maximum longitudinal temperature sensitivity. As temperature is increased, the thermally expansive confining structure expands at a rate faster than the optical fiber which causes a partial decrease in the amplitude of the permanent microbends and a partial return to normal optical transmission. Thus, the optical output is increased as the temperature is increased and vice versa.

The present invention is an intensity sensor and, thus, uses multimode optical fibers which are much easier to work with over single-mode optical fibers. Single-mode optical fibers are required for interferometric sensors but require a coherent light source and more complex detection electronics. In a preferred embodiment of the present invention, the multimode optical fibers are a step- or graded-index glass material. Graded-index optical fibers are capable of producing a much more sensitive device for sensing temperature changes, provided that the mechanical wavelength of the microbends is chosen correctly.

In accordance with another aspect of the invention, a method is provided for sensing temperature changes in a subject element undergoing temperature changes and being monitored. The optical fiber containing the permanent microbends of sufficiently small mechanical wavelength is bonded only at its ends to a confining structure and stretched along with the thermally expansive confining structure so that the resulting diminution in the amplitude of the permanent microbends, combined with the increase in the mechanical wavelength of the deformations, improves the optical transmission of the optical fiber. Because the improvement in the optical transmission is measurable, a quantitative relationship can be established between the increased optical transmission and the temperature change in the subject element.

An advantage of the present invention is that the optical fiber contains permanent microbends, thus no bulky external structure is needed to maintain the optical fiber in its microbend configuration.

A further advantage of the present invention is that the optical fiber is secured to a thermally expansive confining structure only at either end of its microbend section. Considerable size and geometric advantages are realized because of the absence of any restraining structure surrounding the microbend section.

A still further advantage of the present invention is that the optical fiber may be constructed of graded-index glass fiber which is capable of producing an extremely sensitive device.

Additional advantages and novel features of the invention will become apparent to those skilled in the art upon examination of the following description or may be learned by practice of the invention. The advantages and features of the invention may be realized and attained by means of the processes and apparatus particularly pointed out in the

DESCRIPTION OF THE DRAWINGS

The accompanying drawings, which are incorporated in and form part of the specification, illustrate embodiments of the present invention and, together with the description, serve to explain the principles, operation, features, and advantages of the present invention.

DETAILED DESCRIPTION OF THE INVENTION

Figure 1:
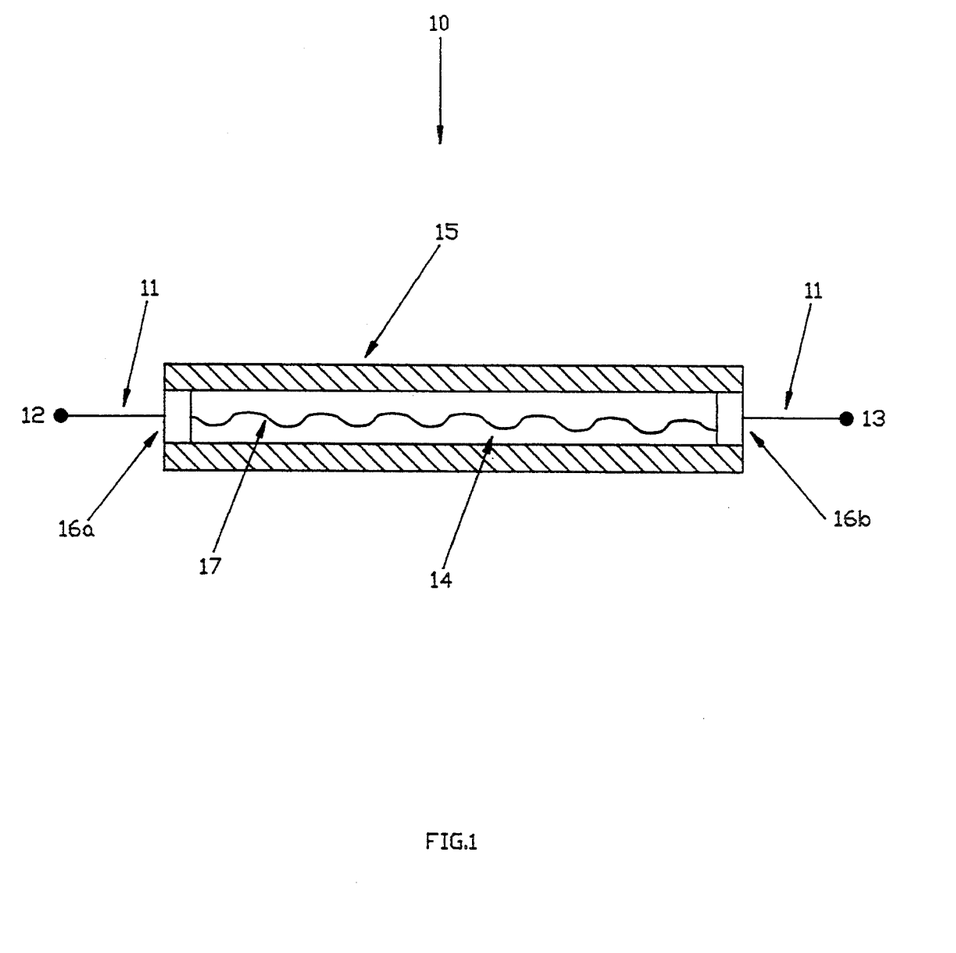
FIG. 1 depicts a schematic diagram of the microbend fiber-optic temperature sensor of the present invention in a transmissive mode.

FIG. 1 illustrates the microbend fiber-optic temperature sensor 10 of the present invention in a preferred embodiment which is useful in making measurements even in the presence of severe electromagnetic interference or potentially hazardous sparks. Sensor 10 is constructed from an optical fiber 11 coupled on one end to an optical source 12 and, on its other end, to an optical detector 13, although in the alternative embodiment of FIG. 3, optical source 12 and optical detector 13 may be positioned on the same end of thermally expansive structure 15, whereby light may be transmitted through the optical fiber 11, reflected and detected at the same end of optical fiber 11.

A section 14 of optical fiber 11 contains a plurality of permanently induced microbends, that is, random or periodic undulations in the longitudinal axis of the optical fiber, which are typically small in amplitude relative to the diameter of the optical fiber. In a preferred embodiment, the microbends are periodic and quasi-sinusoidal. Optical fiber 11 is inserted through a thermally expansive structure 15 and attached to the thermally expansive structure 15 for which the temperature is to be measured by the sensor 10, although in an alternative embodiment where size is not an issue, the thermally expansive structure 15 may be an aluminum substrate placed within a protective housing. Optical fiber 11 is attached to the thermally expansive structure 15 by epoxy bond 16a, 16b at either end of the microbend section 14.

Optical source 12 and optical detector 13 are of a type well-known in the art and commercially-available. Optical fiber 11 is attached to the thermally expansive structure 15 by bonding or crimping optical fiber 11 only at its ends in a manner well-known in the art.

In practice, optical fiber 11 may be of any optically transmissive material. In the preferred embodiment, it is of optical quality graded-index glass fiber, such as germanium-doped silica, clad with buffer layer 17 surrounding optical fiber 11, although optical quality commercial plastic material or other optical quality conventional material may be used. Optical quality graded-index glass material, such as germanium-doped silica, has the advantages of high sensitivity and great mechanical stability. Buffer layer 17 may be of any material, such as polyimide, nylon, silicon, acrylate, aluminum, or gold, to protect against micro-flaws in the optical fiber or environmental degradation that would otherwise cause optical fiber 11 to fracture or break.

The present invention capitalizes on the microbend loss in an optical fiber as a transduction mechanism. The microbends, in this case, are permanently impressed in the optical fiber through heat and pressure, as opposed to being maintained in the optical fiber by means of aleformer plates. Unless the graded-index glass fiber of the preferred embodiment is deliberately manufactured with microbends, they must be introduced under heat and pressure between two grooved plates. The response depicted by the graph of FIG. 2 was obtained by the present invention employing such permanent microbends.

In the preferred embodiment, the temperature sensor is configured in a transmissive mode which has the advantages of not requiring a splitter or coupler nor the need to eliminate, or account for, undesired reflections at splices within the overall system. In an alternative embodiment, the temperature sensor is configured in a reflective mode which has the advantage of being able to insert the temperature sensor into a blind hole.

Figure 2:
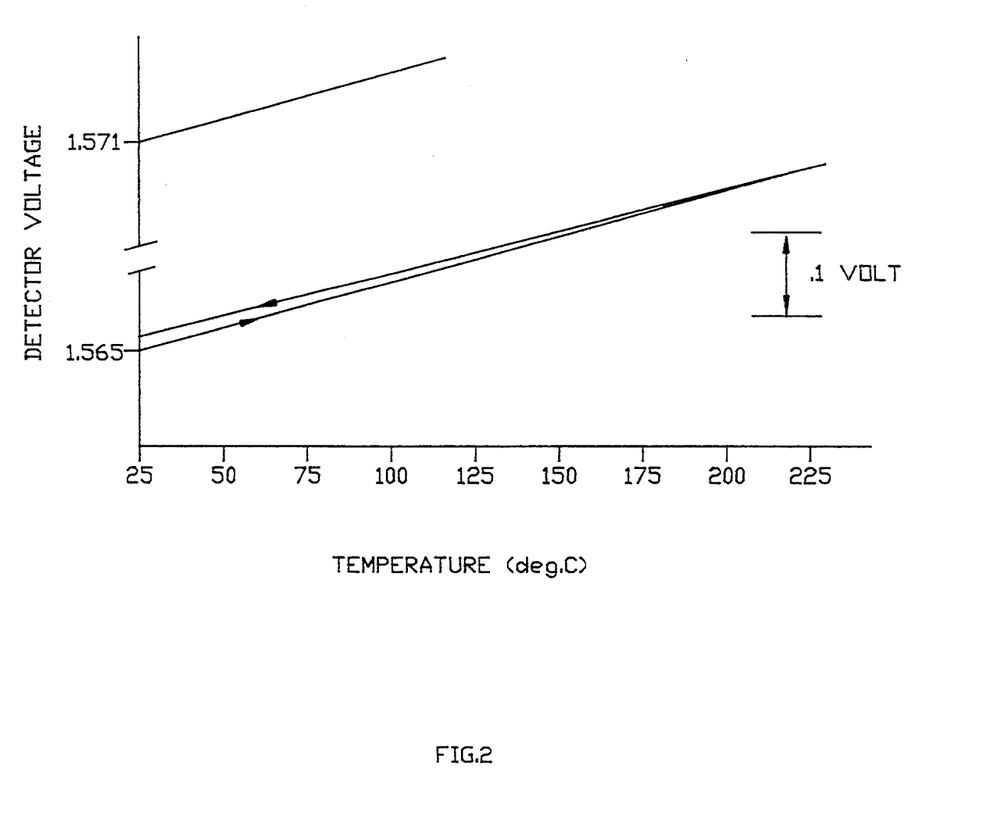
FIG. 2 depicts a graph of detector voltages versus temperature for an alternative embodiment of the present invention utilizing a step-index optical fiber with permanent microbends attached to an aluminum confining structure in the form of an aluminum substrate, and illustrating the response of a permanently microbent fiber to temperature when bonded to a thermally expansive substrate.

FIG. 2 illustrates a graph of the response of said microbend fiber-optic temperature sensor 10 of the present invention in an alternative embodiment. Said optical fiber 11 constructed of a step-index glass fiber was bonded to a thermally expansive aluminum substrate along with a thermocouple. The ends of optical fiber 11 were connected to a light-emitting diode (LED) light source and to a light detector. Section 14 of optical fiber 11 was configured to be one-inch in length. The microbend fiber-optic temperature sensor 10 was heated, and the detector signal versus the thermocouple output was recorded on an x-y plotter. As the aluminum substrate expanded, the optical signal increased as the microbent glass fiber was stretched. The output of optical fiber 11 results from the thermal expansion of the aluminum structure and the strain sensitivity of the optical fiber. FIG. 2 depicts two curves which are displaced slightly to illustrate the response of temperature sensor 10 over two different temperature ranges.

Also, FIG. 2 illustrates a rapid and reversible response to temperature variations in the temperature sensor 10 of the present invention, i.e., the temperature sensor can be used indefinitely for a range of temperatures without experiencing degradation. The present invention provides a constant operation of the temperature sensor over an increasing and decreasing range of temperatures.

Figure 3:
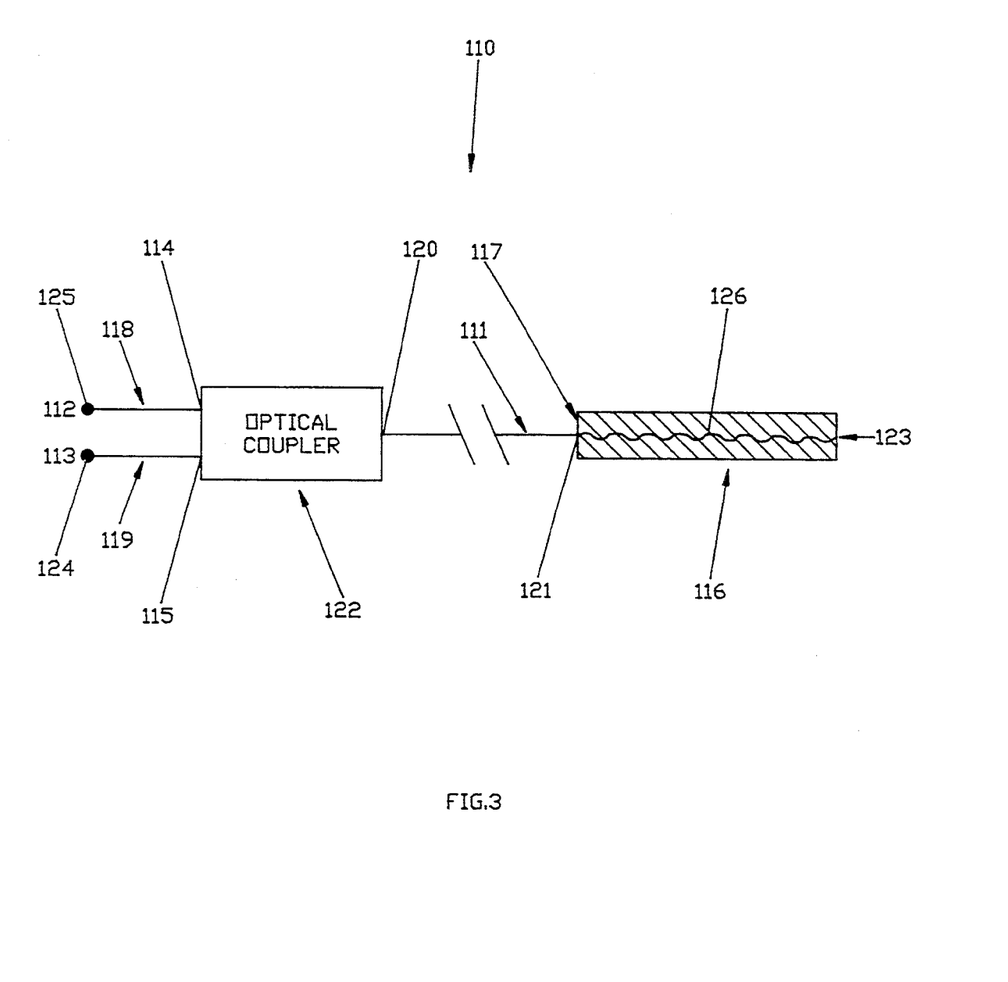
FIG. 3 depicts a schematic diagram of an alternative embodiment of the microbend fiber-optic temperature sensor of the present invention in a reflective mode.

FIG. 3 illustrates microbend fiber-optic temperature sensor 110 of another embodiment of the present invention in a reflective mode wherein sensor 110 includes thermally expansive structure 116 connected at input-/output face 117 with input/output optical fiber 111 at input/output connection 121. Input/output optical fiber 111 is connected to optical coupler 122 at input connection 120. Optical fiber 118 is connected to optical coupler 122 at input connection 114, and with optical source 112 at source connection 125. Optical fiber 119 is connected to optical coupler 122 at output connection 115, and with optical detector 113 at detector connection 124. Optical source 112 and optical detector 113 are positioned on the same end of thermally expansive structure 116, whereby light may be transmitted through the optical fiber 111, and reflected and detected at the same end of optical fiber 111.

In practice, light from optical source 112 is directed through input optical fiber 118, optical coupler 122, and input/output optical fiber 111 at input/output face 117. The light then travels through microbend section 126 which contains a plurality of permanently induced microbends and which is attached to thermally expansive structure 116 only at its ends, reflects off internal reflective surface 123, and travels back through microbend section 126 into input/output fiber 111 to optical coupler 122 where it is diverted by optical coupler 122 to optical detector 113 through optical fiber 119. When temperature is varied in thermally expansive structure 116, microbend section 126 is stretched and the light output, as measured by optical detector 113, varies with the amount of temperature variance in a manner similar to that in the system of FIG. 1.

Optical coupler 122 is of a well-known, commercially-available type. Other elements and modes of operation are of the type described above relating to the system of FIG. 1.

Figure 4:
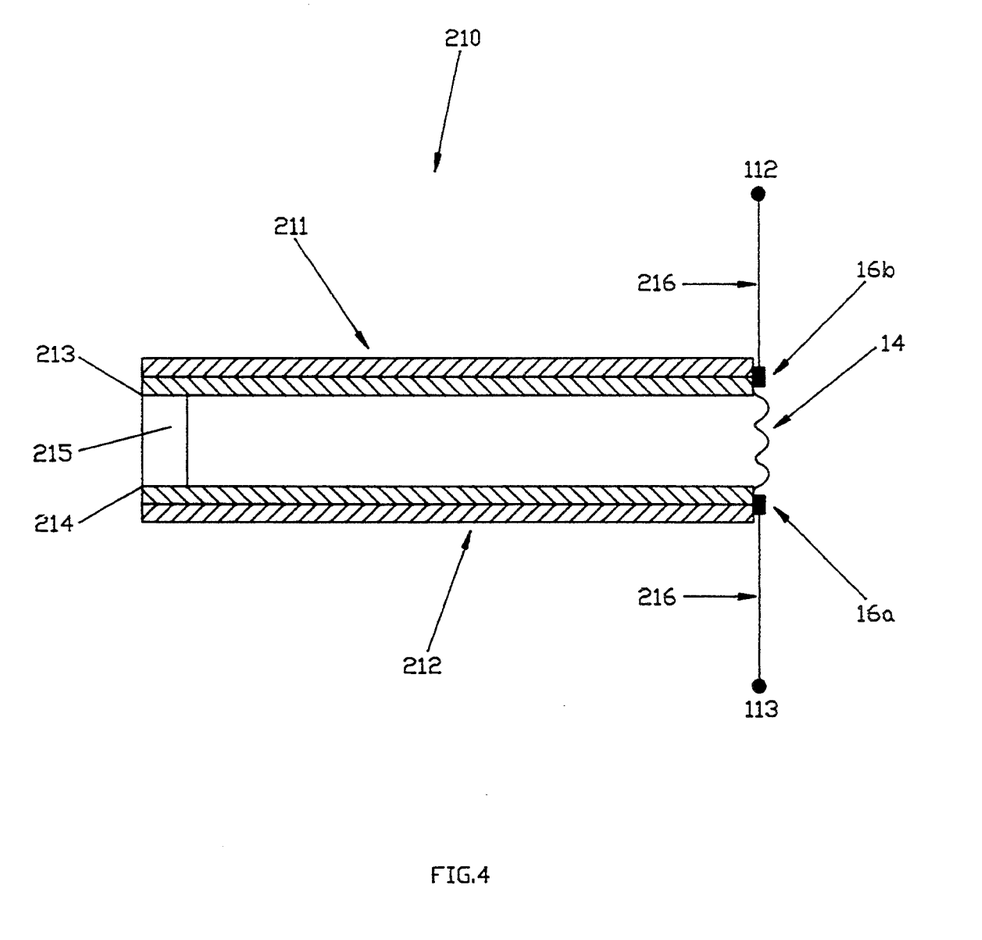
FIG. 4 depicts a schematic diagram of an alternative embodiment of the present invention in a bimetallic assembly which provides high sensitivity within a narrow temperature range.

FIG. 4 illustrates microbend fiber-optic temperature sensor 210 of another embodiment of the present invention wherein sensor 210 is constructed from optical fiber 11 of the system of FIG. 1, coupled on one end to optical source 112 and, on its other end, to an optical detector 113. Optical fiber 11 is attached to at least one bimetallic strip 211 by epoxy bond 16a, 16b at either end of the microbend section 14.

Temperature sensor 210 includes bimetallic strip 211 connected at attachment face 213. Coupler 215 is connected to bimetallic strip 211 at attachment face 213. Bimetallic strip 212 is connected to mechanical coupler 215 at attachment face 214.

In practice, bimetallic strips 211 and 212 are subjected to temperature which cause the bimetallic strips to extend outward or inward away from each other thus increasing or decreasing the tension of the optical fiber leads 216 depending upon the orientation of the bimetallic strips. The length of bimetallic strips 211 and 212, and the length of microbend section 14 can be varied depending on the temperature ranges sought to be measured. Changes in the length of the bimetallic strips or microbend section cause a corresponding change in temperature sensitivity. Bimetallic strips 211 and 212 are of a type well-known in the art and commercially-available.

In the alternative embodiment configured as a bimetallic assembly, the temperature sensor is configured to use at least one bimetallic strip which has the advantage of providing the capability to produce a sensitive device over a narrow range of temperatures.

Figure 5:
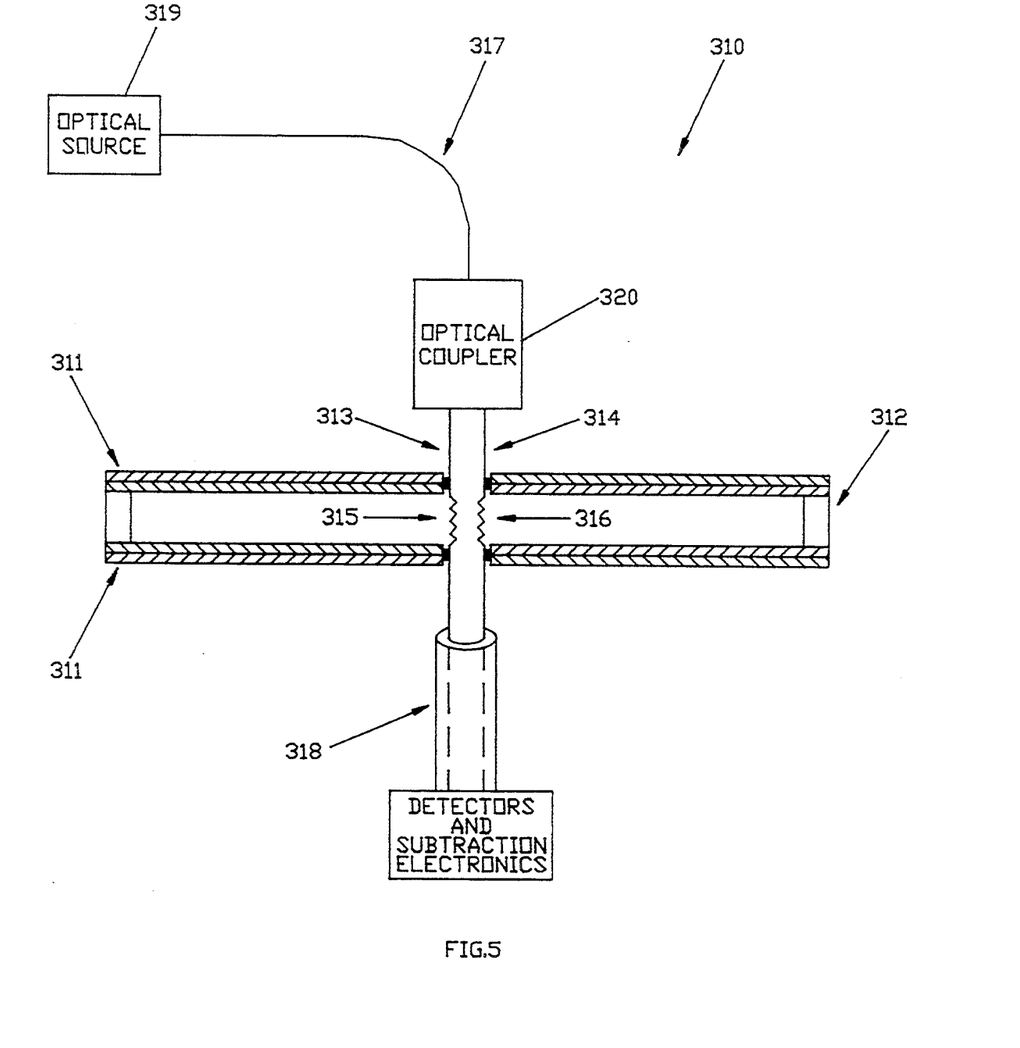
FIG. 5 depicts a schematic diagram of an alternative embodiment of FIG. 4.

FIG. 5 illustrates a further alternative embodiment of the temperature sensor of FIG. 4, the temperature sensor 310 is configured with an optical source 319, an optical fiber lead 317 connected to an optical coupler 320, connected to optical fiber leads 313 and 314, two pairs of bimetallic strips 311 and 312 in a reverse orientation, each with its own optical fiber leads 313 and 314 with microbend sections 315 and 316, such that the tension in the microbend section 315 and 316 is increased or decreased depending upon the bimetallic strip used for attachment. By electronically subtracting the signals produced from the response of the two microbent optical fibers, in a manner well-known in the art, undesired common-mode noise can be eliminated while the temperature-dependent signal will be maintained. The common-mode noise could be produced by fluctuations in the optical source, or bends in the optical fiber lead 317 and two-fiber cable 318

EXAMPLE 1

A graded-index glass fiber with permanent microbends is inserted in a one-inch cylindrical tube, of hypodermic needle dimensions, and bonded or crimped to the cylindrical tube at either end. A one-inch cylindrical tube of hypodermic needle dimensions satisfies strict size requirements of certain applications. The fiber is clad with aluminum as a buffer layer. The cylindrical tube is of a material which is more thermally expansive than the graded-index glass fiber. When the cylindrical tube is subjected to heat, the cylindrical tube thermally expands at a greater rate than the glass fiber which causes a partial decrease in the amplitude of the microbends and a corresponding partial return to the normal optical transmission of the glass fiber. Thus, optical output increases and decreases directly with temperature.

EXAMPLE 2

A step-index, borosilicate glass fiber with permanent microbends one-inch in length was attached to an aluminum substrate at either end, and the entire unit was placed in a protective housing. The glass fiber was clad with polyimide as a buffer layer. The expansive substrate was made of aluminum which is more thermally expansive than the glass fiber. When the aluminum substrate was heated, it thermally expanded at a greater rate than the glass fiber which caused a partial decrease in the amplitude of the microbends and a corresponding partial return to the normal optical transmission of the glass fiber. The aluminum substrate was cycled in temperature several times between room temperature and 200° C. The optical transmission of the glass fiber increased dramatically with temperature as shown in FIG. 2, and was reversible. No degradation in performance was observed after six test patterns, which included one test pattern at 250° C. The slight hysteresis in the curve plotted at 1.565 volts is due to the type of epoxy bond utilized to bond the microbend section of the glass fiber to the aluminum substrate.

The particular sizes, equipment, and examples discussed above are cited merely to illustrate particular embodiments of this invention. It is contemplated that the use of the invention may involve components having different sizes and shapes as long as the principle, i.e., the employment of permanent microbends in a graded-index glass fiber attached to a thermally expansive structure, is followed. It is intended that the scope of the invention be defined by the claims appended hereto.

I claim:

1. An optical sensor for measuring the temperature of a subject element, said sensor comprising:

a length of first optical fiber having first and second ends;

an intermediate permanent microbend section in said first optical fiber having first and second ends including at least one microbend permanently formed in said permanent microbend section;

a first conversion means for translating temperature changes into mechanical displacement of the first end of said permanent microbend section relative to the second end, said means being thermally connected to the subject element being measured, said permanent microbend section of said optical fiber being constrained only at the fast and second ends;

means for introducing light into one end of said permanent microbend section, wherein said means for introducing light comprises an optical source and a fast optical path operatively connecting said optical source and said permanent microbend section;

means for detecting light intensity passing through said permanent microbend section; and means for measuring temperature changes from variations in intensity of detected light caused by movement of the permanent microbend section.

2. The optical sensor of claim 1 wherein said means for detecting light comprises an optical detector and a second optical path operatively connecting said permanent microbend section and said optical detector, said light having traversed said permanent microbend section.

3. The optical sensor of claim 2, wherein said second optical path further comprises an optical fiber for transmitting light from said permanent microbend section to said optical detector.

4. The optical sensor of claim 3, wherein said second optical path is connected to the opposite end of said permanent microbend section from the end to which the first optical path is connected.

5. The optical sensor of claim 1, further comprising means for attaching said fast optical fiber to a surface of the subject element being measured only at each end of said optical fiber wherein said intermediate permanent microbend section is constrained only at the fast and second ends.

6. The optical sensor of claim 1 wherein said first optical fiber is graded-index glass fiber transmissive to the introduced light.

7. The optical sensor of claim 6 wherein said graded-index glass fiber comprises germanium-doped silica.

8. The optical sensor of claim 1, wherein said first optical fiber further comprises a buffer layer.

9. The optical sensor of claim 1, wherein said buffer layer of said first optical fiber is selected from the group consisting of polyimide, nylon, silicon, acrylate, and combinations thereof.

10. The optical sensor of claim 1, wherein said buffer layer of said first optical fiber is selected from the group consisting of aluminum and gold and combinations thereof.

11. The optical sensor of claim 1, wherein said fast optical path further comprises an optical fiber for transmitting light from said optical source to said permanent microbend section.

12. The optical sensor of claim 1, further comprising:

at least one reflective surface positioned such that light introduced into said first end of said permanent microbend section internally reflects off said reflective surface which is positioned at the second end of said permanent microbend section;

a further optical path having one end connected to said first end of said permanent microbend section;

an optical coupler for separating reflected light from reflective surface, said optical coupler being operatively connected to said means for introducing fight, said means for detecting light intensity, and the other end of said third optical path;

wherein light from said means for introducing light passes through said optical coupler and said third optical path into said permanent microbend section at said first end of the permanent microbend section, internally reflects off at least said reflective surface back through said first end of the permanent microbend section, and passes through said third optical path and said optical coupler into said means for detecting light intensity.

13. The optical sensor of claim 12, wherein said third optical path comprises optical fiber means.

14. The optical sensor of claim 12, wherein said first end and said second end of said permanent microbend section are disposed substantially in series such that said reflected light is directed back out through said first end of said permanent microbend section and into said third optical path.

15. The optical sensor of claim 1, wherein said optical sensor has a rapid and reversible response to dynamic ranges of temperature variations.

16. The optical sensor of claim 1, wherein said first end of the permanent microbend section of said fast optical fiber is mechanically connected to said fast conversion means, and said second end of the permanent microbend section is mechanically connected to said fast conversion means.

17. The optical sensor of claim 16 wherein said first conversion means comprises a thermally expansive bimetallic strip which is attached to said fast end of said permanent microbend section.

18. The optical sensor apparatus of claim 17, wherein said thermally expansive strip is positioned such that an increase in temperature produces an increase in displacement.

19. The optical sensor of claim 16, wherein said first conversion means comprises a fast pair of thermally responsive bimetallic strips having first and second bimetallic strip elements, the first bimetallic strip element having a first end which is attached to said first end of said permanent microbend section of said fast optical fiber and the second bimetallic strip element having a first end which is attached to said second end of said microbend section of said fast optical fiber.

20. The optical sensor of claim 19 wherein the first and second strip element of the first pair of thermally responsive bimetallic strips have a relative displacement away from each other with increased temperature, the optical sensor further comprising:

a length of second optical fiber having first and second ends containing an intermediate permanent microbend section in said second optical fiber with at least one microbend permanently formed between the first and second ends of the second optical fiber;

a second conversion means for translating temperature changes into mechanical displacement comprising a second pair of thermally responsive bimetallic strips having first and second bimetallic strip elements having a relative displacement towards each other as a function of increased temperature, the first bimetallic strip element having a first end which is attached to said first end of said permanent microbend section of said second optical fiber and the second bimetallic strip element having a first end which is attached to said second end of said permanent microbend section of said second optical fiber;

input optical communication means connecting said means for introducing fight into said first ends of each permanent microbend section of said first and second optical fibers;

output optical communication means connecting the second ends of each permanent microbend section of said first and second optical fibers to said means for detecting fight intensity; and signal subtraction means to subtract the signals produced from the response of the illumination that has passed through both permanent microbend sections of said first and second optical fibers to indicate the temperature.

21. The optical sensor of claim 1 wherein said first optical fiber is step-index glass fiber transmissive to the introduced light.

22. The optical sensor of claim 21 wherein said step-index glass fiber comprises borosilicate.

* * * * *